United States Patent
Xing et al.

(10) Patent No.: US 10,126,613 B2
(45) Date of Patent: Nov. 13, 2018

(54) DISPLAY PANEL, TOUCH PANEL, LIQUID CRYSTAL DISPLAY DEVICE AND TEST METHOD THEREOF

(71) Applicants: Boe Technology Group Co., Ltd., Beijing (CN); Beijing Boe Optoelectronics Technology Co., Ltd., Beijing (CN)

(72) Inventors: Hongyan Xing, Beijing (CN); Yanyan Yin, Beijing (CN); Jing Xue, Beijing (CN); Bin Ma, Beijing (CN); Liang Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/516,147

(22) PCT Filed: Jan. 26, 2016

(86) PCT No.: PCT/CN2016/072186
§ 371 (c)(1),
(2) Date: Mar. 31, 2017

(87) PCT Pub. No.: WO2017/012325
PCT Pub. Date: Jan. 26, 2017

(65) Prior Publication Data
US 2017/0307944 A1    Oct. 26, 2017

(30) Foreign Application Priority Data
Jul. 17, 2015    (CN) .......................... 2015 1 0423534

(51) Int. Cl.
*G02F 1/1362*    (2006.01)
*G02F 1/1368*    (2006.01)
(Continued)

(52) U.S. Cl.
CPC ...... *G02F 1/136204* (2013.01); *G02F 1/1309* (2013.01); *G02F 1/1368* (2013.01);
(Continued)

(58) Field of Classification Search
None
See application file for complete search history.

(56) References Cited

U.S. PATENT DOCUMENTS

| 2009/0219035 A1 | 9/2009 | Apte |
| 2014/0071355 A1* | 3/2014 | Im ...................... G02F 1/13338 349/12 |

(Continued)

FOREIGN PATENT DOCUMENTS

| CN | 101021628 A | 8/2007 |
| CN | 101666942 | 3/2010 |

(Continued)

OTHER PUBLICATIONS

Machine English Translation of CN101666942.*
(Continued)

*Primary Examiner* — Jermele M Hollington
*Assistant Examiner* — Douglas X Rodriguez
(74) *Attorney, Agent, or Firm* — Calfee, Halter & Griswold LLP

(57) ABSTRACT

The present disclosure relates to a display panel, a liquid crystal display device and a test method thereof. The display panel includes a display area and a GOA circuit area. The GOA circuit area includes a plurality of GOA units arranged on a TFT substrate and metal areas arranged at positions of a CF substrate corresponding to the GOA units, which (Continued)

constitute capacitor structures with the GOA units. The display panel further includes signal lines electrically connected with the capacitor structures and test points elicited through the signal lines. By means of the above configuration, the position where short circuit/open circuit occurs in the GOA circuit area can be found quickly by monitoring the voltage on the test point, thereby shortening the time of seeking ESD and short circuit/open circuit, increasing the analyzing and improving speed.

15 Claims, 9 Drawing Sheets

(51) Int. Cl.
    *G02F 1/13*     (2006.01)
    *G02F 1/1345*     (2006.01)
    *G02F 1/1333*     (2006.01)
    *G06F 3/041*     (2006.01)

(52) U.S. Cl.
    CPC .... *G02F 1/13454* (2013.01); *G02F 1/136286* (2013.01); *G02F 1/13338* (2013.01); *G02F 2001/133302* (2013.01); *G02F 2001/136254* (2013.01); *G06F 3/041* (2013.01)

(56) References Cited

U.S. PATENT DOCUMENTS

| | | | |
|---|---|---|---|
| 2015/0277199 A1* | 10/2015 | Chang | G02F 1/136286 349/12 |
| 2015/0332979 A1 | 11/2015 | Yang et al. | |
| 2016/0329354 A1 | 11/2016 | Li et al. | |

FOREIGN PATENT DOCUMENTS

| | | |
|---|---|---|
| CN | 101957522 | 1/2011 |
| CN | 102723311 A | 10/2012 |
| CN | 103298264 A | 7/2013 |
| CN | 104483777 A | 4/2015 |
| CN | 104991388 | 10/2015 |
| JP | 2010079314 | 4/2010 |

OTHER PUBLICATIONS

International Search Report and Written Opinion from PCT/CN16/72186 dated May 5, 2016.

First Office Action for Chinese Patent Application No. 201510423534.X dated Aug. 1, 2017.

* cited by examiner

DISPLAY PANEL, TOUCH PANEL, LIQUID CRYSTAL DISPLAY DEVICE AND TEST METHOD THEREOF

RELATED APPLICATIONS

The present application is the U.S. national phase entry of the international application PCT/CN2016/072186, with an international filing date of Jan. 26, 2016, which claims the benefit of Chinese Patent Application No. 201510423534.X, filed on Jul. 17, 2015, the entire disclosures of which are incorporated herein by reference.

TECHNICAL FIELD

The present invention relates to the liquid crystal display technology, particularly to a display panel, a touch panel, a liquid crystal display device and a test method thereof using a GOA (gate driver on array) circuit.

BACKGROUND

In an active matrix liquid crystal display, each pixel has a thin film transistor (TFT). The gate electrode of the TFT is electrically connected to a scanning line in the horizontal direction, the drain electrode is electrically connected to a data line in the vertical direction, and the source electrode is electrically connected to a pixel electrode. If a sufficient positive voltage is applied to a certain scanning line in the horizontal direction, all TFTs on this scanning line will be turned on. The pixel electrode corresponding to this scanning line is connected with the data line in the vertical direction, and the signal voltage on the data line is written into the pixel. Generally, the driving circuit is mainly constituted by an integrated circuit (IC) adhered outside the liquid crystal panel.

In recent years, the GOA technology is proposed. The GOA technology manufactures the gate driver circuit on an array substrate directly, so as to replace the driving chip manufactured by an external silicon wafer. Nowadays, in the field of liquid crystal display technology, the GOA technology has been developed and applied widely, because the GOA technology can reduce the production process and reduce the product process cost. In addition, the GOA panel can be classified into a unilateral GOA panel and a bilateral GOA panel in terms of the GOA distribution.

Although the GOA technology has been widely used in the liquid crystal manufacturing field, due to the complexity of its circuit connection and process, the yield rate of the GOA circuit is not very high. One of the main factors that influence its yield rate is electro-static accumulation and electro-static discharge (ESD). In the existing manufacturing process of the GOA circuit, because the wires on the panel are relatively close to each other, the unfavorable conditions such as ESD may occur easily.

FIG. 1 is a schematic diagram representing a display panel using the GOA technology in the prior art.

As shown in FIG. 1, in the display panel using the GOA technology, the display panel includes: a display area and a GOA area. The display area includes a plurality of gate lines and a plurality of data lines that intersect with each other vertically and horizontally. GOA units are arranged in the GOA area. If ESD and short (i.e., the short circuit point in FIG. 1) occur, for the display panel using the GOA technology, at present, they can only be investigated one by one along the wires of the panel (gate lines and data lines) and the GOA units, and it is not ensured to find them. Because the ESD points within the GOA unit and between the signal wires are elusive, it is not easy to be found and positioned accurately, which influences the analysis and improvement. Hence, in such a situation, the analysis efficiency of the ESD related defects will be reduced and the improving accuracy thereof will also be reduced.

SUMMARY

In view of the above problems, the present invention aims to providing a display panel, a liquid crystal display device and a circuit test method thereof that can position the ESD and short circuit/open circuit quickly and accurately.

The display panel of embodiments of the present invention includes a display area and a GOA circuit area. The GOA circuit area includes: a plurality of GOA units arranged on a TFT substrate, and metal areas arranged at positions of a CF substrate corresponding to the GOA units and constituting capacitor structures with the GOA units.

The display panel further includes signal lines electrically connected with the capacitor structures, and test points elicited through the signal lines.

Optionally, the metal area is an ITO layer.

Optionally, the metal area is formed into a rectangle corresponding to the GOA unit.

Optionally, the test point is arranged outside the GOA circuit area.

Optionally, the signal line is connected with the GOA circuit area in the capacitor structure.

Optionally, a working state of the GOA circuit area is monitored by testing a change of voltage on the test point.

Optionally, the test point is a test point on an FPC outside the GOA circuit area to which the signal line is led through an IC circuit.

Optionally, the GOA circuit area is in symmetric distribution at two sides of the display area. Corresponding to the GOA circuit area, the metal areas are also in symmetric distribution at the two sides of the display area.

In a circuit test method of a display panel according to embodiments of the present invention, the display panel includes a display area and a GOA circuit area. The GOA circuit area includes GOA units arranged on a TFT substrate. The method includes the steps of: a capacitor constituting step, arranging a metal area at a position on a CF substrate corresponding to the GOA unit so as to enable the metal area to constitute a capacitor structure with the GOA unit; a signal eliciting step, eliciting a signal line from the capacitor structure; a test point forming step, eliciting the signal line to the outside of the GOA circuit area and taking an eliciting point outside the GOA circuit area as a test point; and a signal test step, monitoring a working state of the GOA unit by testing a change of voltage on the test point.

Optionally, in the capacitor constituting step, the metal area is constituted using an ITO layer.

Optionally, in the capacitor constituting step, the metal area is formed into a rectangle.

Optionally, in the signal eliciting step, the signal line is connected with the GOA circuit area in the capacitor structure so as to elicit a signal.

Optionally, in the test point forming step, an eliciting point on an FPC outside the GOA circuit area to which a signal is led by the signal line through an IC circuit is taken as a test point.

Optionally, in the signal test step, a working state of the GOA circuit area is monitored by testing a change of voltage on the test point.

Optionally, in the signal test step, when the change of voltage on the test point is an aperiodic change, it is determined that the working state of the GOA circuit area is an abnormal state.

Optionally, in the capacitor constituting step: the GOA circuit area is in symmetric distribution at two sides of the display area; corresponding to the GOA circuit area, the metal area is also in symmetric distribution at the two sides of the display area.

The display panel according to embodiments of the present invention includes: a display area and a GOA circuit area.

The GOA circuit area includes: a plurality of GOA units arranged on a TFT substrate, an insulating layer arranged on the TFT substrate, and a metal area layer arranged on the insulating layer. The metal area layer and the GOA units constitute a capacitor structure. The display panel further includes: a signal line electrically connected with the capacitor structure, and a test point elicited through the signal line.

Optionally, the metal area layer is an ITO layer.

Optionally, the signal line is connected with the GOA circuit area in the capacitor structure.

Optionally, the GOA circuit area is in symmetric distribution at two sides of the display area; corresponding to the GOA circuit area, the metal area is also in symmetric distribution at the two sides of the display area.

Optionally, the test point is a test point on an FPC outside the GOA circuit area to which the signal line is led through an IC circuit.

In a circuit test method of a display panel, the display panel includes a display area and a GOA circuit area. The GOA circuit area includes GOA units arranged on a TFT substrate. The method includes the steps of: a capacitor constituting step, arranging an insulating layer and a metal area layer on the TFT substrate successively, the metal area layer and the TFT substrate provided with GOA units constitute a capacitor structure; a signal eliciting step, eliciting a signal line from the capacitor structure; a test point forming step, eliciting the signal line to the outside of the GOA circuit area and taking an eliciting point outside the GOA circuit area as a test point; and a signal test step, monitoring a working state of the GOA unit by testing a change of voltage on the test point.

Optionally, in the capacitor constituting step, the metal area layer is to constituted using an ITO layer.

Optionally, in the signal eliciting step, the signal line is connected with the GOA circuit area in the capacitor structure so as to elicit a signal.

Optionally, in the test point forming step, an eliciting point on an FPC outside the GOA circuit area to which a signal is led by the signal line through an IC circuit is taken as a test point.

A liquid crystal display device according to embodiments of the present invention has a display panel of the above structure.

A circuit test method of a display panel of a liquid crystal display device according to embodiments of the present invention uses the circuit test method of the above display panel.

A touch panel according to embodiments of the present invention has a glass cover plate, and a display panel and a touch layer arranged under the glass cover plate from top to bottom. The display panel includes a TFT substrate. A plurality of GOA units are arranged on the TFT substrate. A metal area is arranged at a position of a lower surface of the glass cover plate corresponding to the GOA unit, and the metal area and the GOA unit constitute a capacitor structure. The touch panel further includes: a signal line electrically connected with the capacitor structure; and a test point elicited through the signal line.

Optionally, the metal area is an ITO layer.

Optionally, the metal area is formed into a rectangle corresponding to the GOA unit.

Optionally, the touch panel is an in-cell touch panel. The touch layer and the display panel are integrated together, and the touch layer is embedded into the display panel.

Optionally, the touch panel is an on-cell touch panel. The touch layer and the display panel are integrated together, and the touch layer is located above the display panel.

Optionally, the touch panel is an OGS touch panel. The touch layer and the glass cover plate are integrated together.

In a circuit test method of a touch panel according to embodiments of the present invention, the touch panel has a glass cover plate, and a display panel and a touch layer arranged under the glass cover plate from top to bottom. The display panel includes a TFT substrate on which a plurality of GOA units are arranged. The method includes the steps of: a capacitor constituting step, arranging a metal area at a position of a lower surface of the glass cover plate corresponding to the GOA unit, and the metal area and the GOA unit constituting a capacitor structure; a signal eliciting step, eliciting a signal line from the capacitor structure; a test point forming step, eliciting the signal line to the outside of the GOA circuit area and taking an eliciting point outside the GOA circuit area as a test point; and a signal test step, monitoring a working state of the GOA unit by testing a change of voltage on the test point.

Optionally, in the capacitor constituting step, the metal area is constituted using an ITO layer.

Optionally, in the signal eliciting step, the signal line is connected with the GOA circuit area in the capacitor structure so as to elicit a signal.

Optionally, in the test point forming step, an eliciting point on an FPC outside the GOA circuit area to which a signal is led by the signal line through an IC circuit is taken as a test point.

Optionally, the touch panel is an in-cell touch panel. The touch layer and the display panel are integrated together, and the touch layer is embedded into the display panel.

Optionally, the touch panel is an on-cell touch panel. The touch layer and the display panel are integrated together, and the touch layer is located above the display panel.

Optionally, the touch panel is an OGS touch panel. The touch layer and the glass cover plate are integrated together.

An out-cell touch panel according to embodiments of the present invention has a glass cover plate, a touch layer arranged under the glass cover plate, and a display panel arranged under the touch layer successively from top to bottom. The display panel includes a TFT substrate. A plurality of GOA units are arranged on the TFT substrate. A metal area is arranged at a position of a lower surface of the glass cover plate corresponding to the GOA unit, and the metal area and the GOA unit constitute a capacitor structure. The touch panel further includes: a signal line electrically connected with the capacitor structure; and a test point elicited through the signal line.

Optionally, the metal area is an ITO layer.

Optionally, the metal area is formed into a rectangle corresponding to the GOA unit.

In a circuit test method of an out-cell touch panel according to embodiments of the present invention, the out-cell touch panel has a glass cover plate, a touch layer arranged under the glass cover plate, and a display panel arranged under the touch layer from top to bottom. The display panel includes a TFT substrate. The method includes the steps of: a capacitor constituting step, arranging a metal area at a position of a lower surface of the glass cover plate corresponding to the GOA unit, and the metal area and the GOA unit constituting a capacitor structure; a signal eliciting step, eliciting a signal line from the capacitor structure; a test point forming step, eliciting the signal line to the outside of the GOA circuit area and taking an eliciting point outside the GOA circuit area as a test point; and a signal test step, monitoring a working state of the GOA unit by testing a change of voltage on the test point.

Optionally, in the capacitor constituting step, the metal area is constituted using an ITO layer.

Optionally, in the signal eliciting step, the signal line is connected with the GOA circuit area in the capacitor structure so as to elicit a signal.

Optionally, in the test point forming step, an eliciting point on an FPC outside the GOA circuit area to which a signal is led by the signal line through an IC circuit is taken as a test point.

As stated above, in the display panel, the touch panel, the liquid crystal display device and the test method thereof according to embodiments of the present invention, by arranging a metal area at a position on the CF substrate corresponding to the GOA unit and enabling the metal area and the GOA unit to constitute a capacitor structure, a test point is elicited from the capacitor structure to an FPC outside the GOA area. Whether the working state of the GOA unit is normal can be monitored by testing the change of voltage on the test point on the FPC. If the change of voltage on the above test point is an aperiodic change, it will be determined that the working state of the GOA circuit area is an abnormal state. Therefore, in the present invention, the position where short circuit/open circuit occurs in the GOA circuit area can be found quickly by monitoring the voltage on the test point, thereby shortening the time of seeking ESD and short circuit/open circuit, increasing the analyzing and improving speed.

DETAILED DESCRIPTION OF THE INVENTION

What will be introduced next are some of the plurality of embodiments of the present invention, which aim to providing basic understanding to the present invention, rather than identifying the key or critical elements or defining the scopes to be claimed.

Embodiment 1

Figure 1:
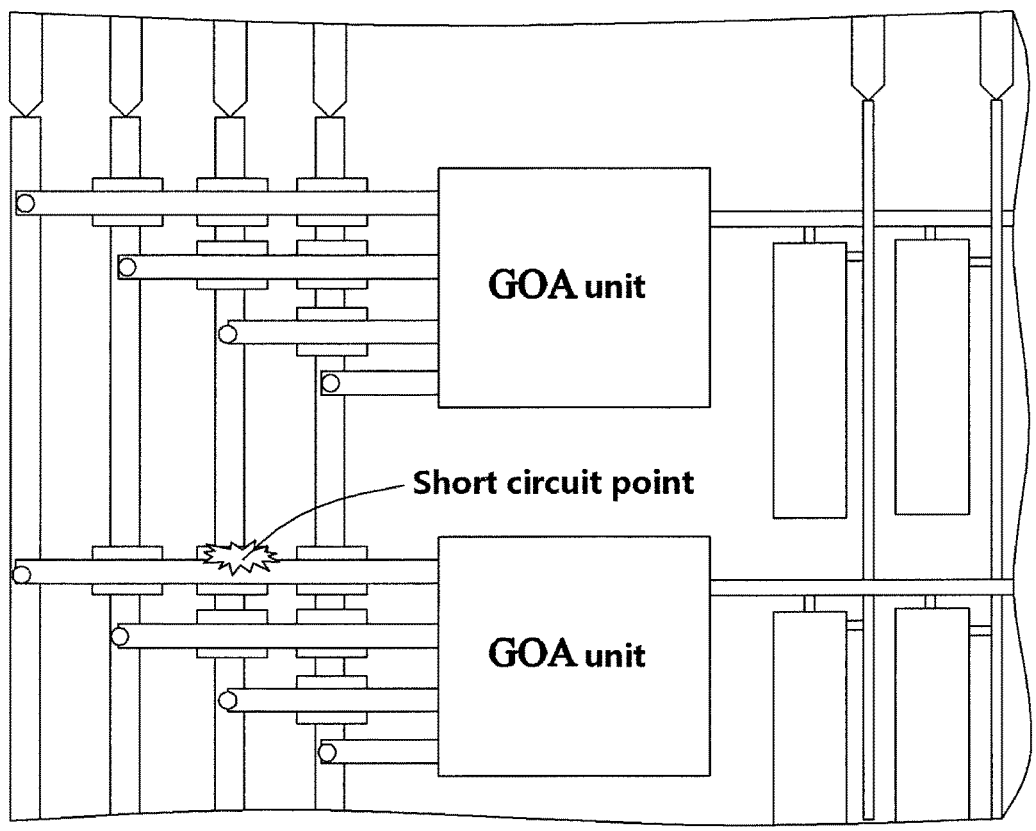
FIG. 1 is a schematic diagram representing a display panel using the GOA technology in the prior art.
Figure 2:
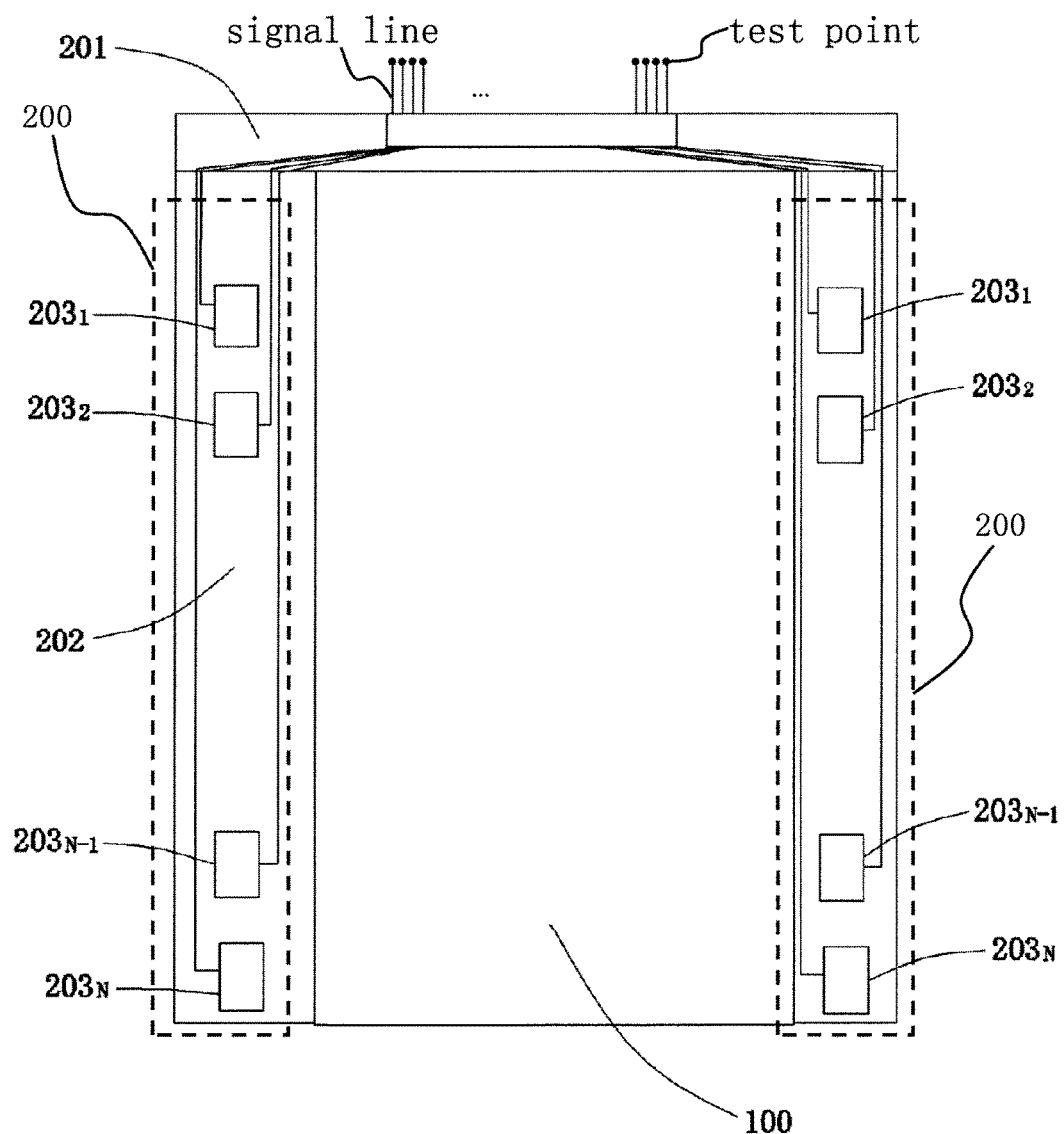
FIG. 2 is a schematic diagram representing a display panel of embodiment 1 of the present invention.

FIG. 2 is a schematic diagram representing a display panel of embodiment 1 of the present invention.

Next, the structure of the display panel of the embodiment of the present invention will be illustrated with reference to FIG. 2.

As shown in FIG. 2, the display panel according to the embodiment of the present application includes: a display area 100 and a GOA circuit area 200 arranged at two sides of the display area 100.

The GOA circuit area 200 includes: a plurality of GOA units arranged on a TFT substrate 201 (the positions of the GOA units are not shown in FIG. 2), and N metal areas $203_1$-$203_N$ arranged at positions of a CF substrate 202 corresponding to the GOA units and constituting capacitor structures with the GOA units. The metal areas $203_1$-$203_N$ here are also called collectively a metal area 203 hereinafter.

Because FIG. 2 is a top view, it cannot reflect the laminated relationship between the TFT substrate 201 and the CF substrate 202. Here, the laminated relationship between the TFT substrate and the CF (color film) substrate in a liquid crystal display panel is illustrated with reference to the conventional technology of the art.

Figure 3:
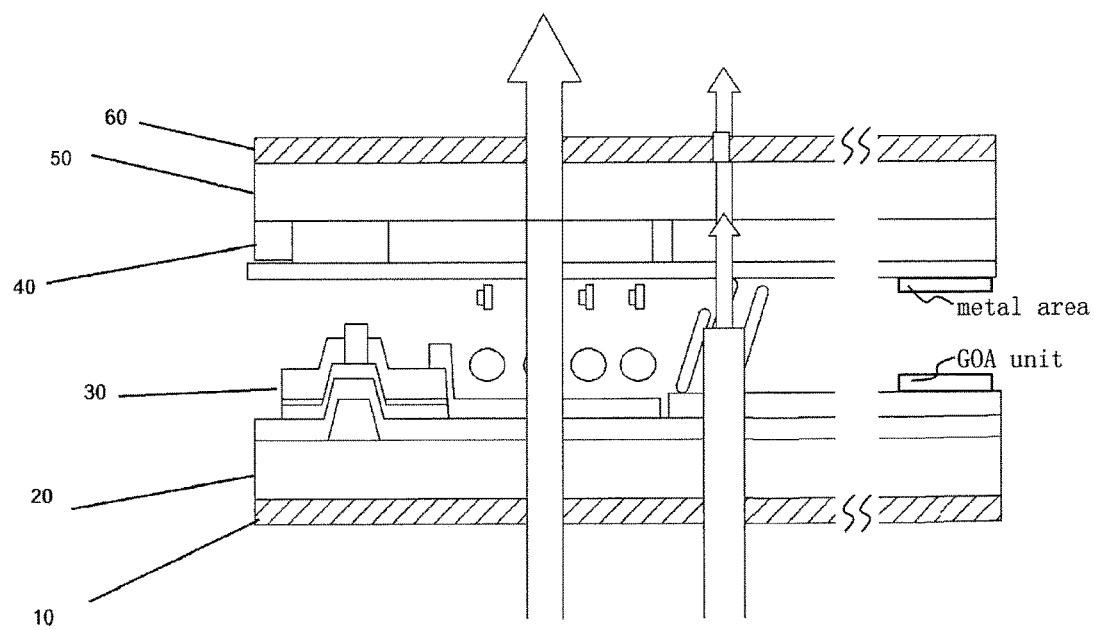
FIG. 3 is a schematic diagram representing a substrate structure of a liquid crystal display panel according to an embodiment of the present disclosure.

FIG. 3 is a schematic diagram representing a substrate structure of a liquid crystal display panel according to an embodiment of the present disclosure. As shown in FIG. 3, a lower polarizer 10, a lower glass substrate 20, a TFT substrate 30, a CF (i.e., color film) substrate 40, an upper glass substrate 50, and an upper polarizer 60 are formed successively from the bottom to top.

Generally, in the GOA technology, the GOA units are formed on the TFT substrate 30. In the present invention, in order to form a capacitor structure with the existing GOA unit, a layer of regularly distributed metal areas is formed in an area on the CF substrate corresponding to the GOA units. In this way, the CF substrate provided with the metal areas and the TFT substrate provided with the GOA unit are equivalent to two oppositely arranged conductive plates that constitute a capacitor. Electric capacity will be generated between such two oppositely arranged conductive plates.

In the present invention, the metal area 203 can be constituted by an ITO (indium tin oxide) conductive layer. The ITO conductive layer is formed by sputtering the transparent ITO conductive film coating using methods such as magnetron sputtering (the manufacturing methods of the ITO film include evaporation, sputtering, reactive ion plating, chemical vapor deposition, pyrolysis spraying etc., however, the most frequently used is the reactive magnetron sputtering method). The ITO conductive layer has conductivity and transparency.

Regarding the shape of the metal area 203, it can be formed into a rectangle corresponding to the GOA unit, and can also be formed into various other shapes, for example, shapes of circular pattern, ellipse pattern and so on. It is the optimal choice that the metal area 203 is formed into a rectangle.

Regarding the distribution of the metal areas 203, if the GOA circuit area is in symmetric distribution at two sides of the display area, corresponding to the GOA circuit area, the metal areas 203 are also in symmetric distribution at the two sides of the display area. Moreover, the number of the metal areas 203 is optionally the same as that of the GOA units, for example, N metal areas $203_1$-$203_N$ are formed corresponding to N GOA units.

As stated above, several capacitor structures are constitute with the metal areas 203 and the GOA units, a signal line is then elicited from such a capacitor structure. The signal line is led to an FPC through an integrated circuit (IC) and the eliciting end point of the signal line on the FPC is taken as a test point. Here, the signal line is elicited from the above capacitor structure, optionally from the GOA circuit area, that is to say, it is elicited from the TFT substrate side where the GOA circuit area is arranged.

As stated above, the capacitor structure is formed and the test point is elicited through the signal line, thus it can be monitored whether the working state of the GOA unit is normal by testing the change of voltage on the test point on the FPC. Specifically, the periodic change of the AC signal on the TFT substrate leads to periodic change of the voltage on the CF substrate. If short circuit or open circuit occurs to the signal line of the GOA circuit area on the TFT substrate, the voltage on the CF substrate will rise, namely, the voltage of the above capacitor structure will also rise. Hence, when it is monitored that the change of voltage on the above test point is an aperiodic change, it is determined that the working state of the GOA circuit area is an abnormal state.

In this way, the position where short circuit/open circuit occurs in the GOA circuit area can be found quickly by monitoring the voltage on the test point, thereby shortening the time of seeking ESD and short circuit/open circuit, increasing the analyzing and improving speed.

The structure of the display panel of embodiments of the present invention has been illustrated above. Embodiments of the present invention further provide a liquid crystal display device including a display panel formed with the above features.

Next, a circuit test method of a display panel of embodiments of the present invention will be illustrated.

Figure 4:
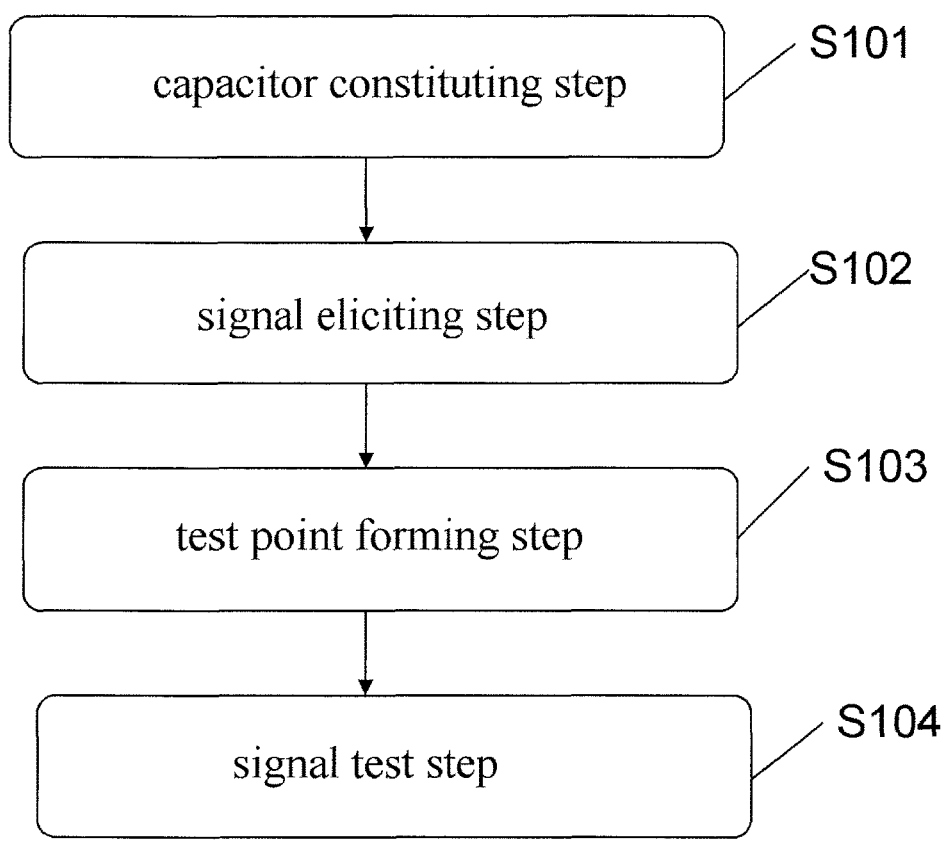
FIG. 4 is a flow chart of a circuit test method of a display panel according to an embodiment of the present invention.

FIG. 4 is a flow chart representing a circuit test method of a display panel of embodiments of the present invention.

As shown in FIG. 4, the circuit test method of a display panel of embodiments of the present invention includes the steps of: a capacitor constituting step S101, arranging a metal area at a position on the CF substrate corresponding to the GOA unit so as to enable the metal area and the GOA unit to constitute a capacitor structure; a signal eliciting step S102, eliciting a signal line from the capacitor structure; a test point forming step S103: eliciting the signal line to the outside of the GOA circuit area and taking an eliciting point outside the GOA circuit area as a test point; and a signal test step S104: monitoring a working state of the GOA unit by testing a change of voltage on the test point. In the above capacitor constituting step S101, the metal area is constituted using an ITO layer. The shape of the metal area can be a rectangle corresponding to the GOA unit, and can also be various other shapes, e.g., shapes of circular patterns, ellipse patterns and so on. Moreover, the distribution of the metal area can be set as a distribution corresponding to the GOA circuit area. If the GOA circuit area is in symmetric distribution at two sides of the display area, corresponding to the GOA circuit area, the metal area is also in symmetric distribution at the two sides of the display area. Moreover, the number of the metal areas is optionally same as that of the GOA units.

In the above signal eliciting step S102, the signal line is connected with the GOA circuit area in the capacitor structure so as to elicit a signal. Specifically, the signal line can elicit the signal from the TFT substrate on which the GOA circuit area is arranged.

In the above test point forming step S103, an eliciting point on an FPC outside the GOA circuit area to which a signal is led by the signal line through an IC circuit is taken as a test point.

In the above signal test step S104, the working state of the GOA circuit area is monitored by testing a change of voltage on the test point. That is, the test point is monitored, when the change of voltage on the test point is an aperiodic change, it is determined that the working state of the GOA circuit area is an abnormal state.

As stated above, the circuit test method of a display panel according to embodiments of the present invention can find the position of short circuit/open circuit in the GOA circuit area quickly by monitoring the voltage on the test point, thereby shortening the time of seeking the ESD and the short circuit/open circuit, increasing the analyzing and improving speed.

The present invention further includes a circuit test method of a display panel of a liquid crystal display device, which adopts the above steps S101-S104.

Embodiment 2

Next, embodiment 2 of the present invention will be illustrated.

In embodiment 2, same as embodiment 1, the display panel includes: a display area and a GOA circuit area. The difference from embodiment 1 lies in the structure of the GOA circuit area.

Figure 5:
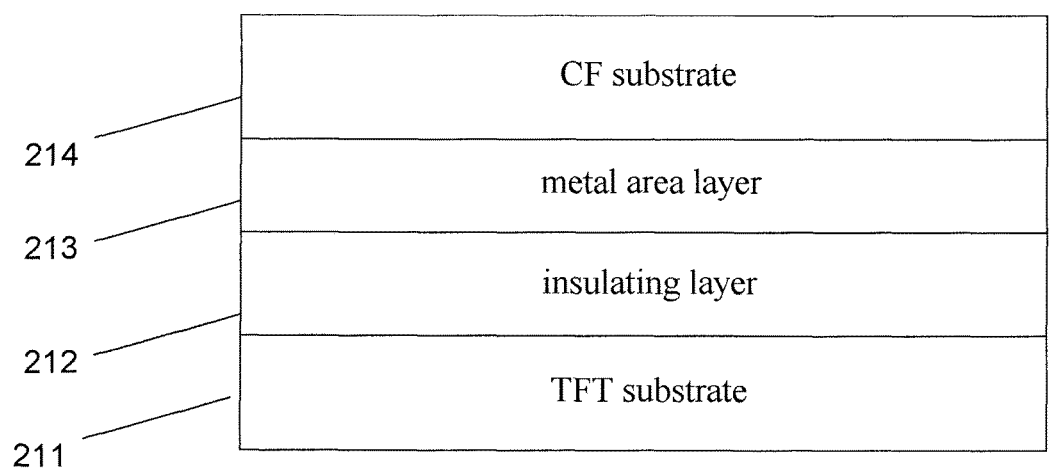
FIG. 5 is a schematic cross-section diagram representing a GOA circuit area in a display panel of embodiment 2 of the present invention.

FIG. 5 is a schematic cross-section diagram representing a GOA circuit area in a display panel of embodiment 2 of the present invention.

As shown in FIG. 5, from bottom to top, the GOA circuit includes: a TFT substrate 211, an insulating layer 212 arranged on the TFT substrate 212, a metal area layer 213 arranged on the insulating layer 211, and a CF substrate 214 arranged on the metal area layer 213. A plurality of GOA units (not shown in FIG. 5) are arranged on the TFT substrate 211.

In embodiment 2, the metal area layer 213 and the TFT substrate 211 on which the GOA units are arranged constitute a capacitor structure, that is to say, the metal area layer 213 and the GOA unit constitute a capacitor structure. In this way, the TFT substrate 211 on which the metal area layer 213 and the GOA units are arranged are equivalent to two oppositely arranged conductive plates that constitute a capacitor. Electric capacity will be generated between such two oppositely arranged conductive plates.

In the present invention, the metal area layer 213 can be constituted by an ITO conductive layer. Moreover, similar as embodiment 1, an electrically connected signal line is elicited from the capacitor structure constituted by the metal area layer 213 and the TFT substrate 211, a test point is elicited through the signal line, this test point is a test point on an FPC outside the GOA circuit area to which the signal line is led through the IC circuit. Optionally, the signal line is connected with the GOA circuit area in the capacitor structure.

On the other hand, if the GOA circuit is in symmetric distribution at two sides of the display area, corresponding to the GOA circuit area, the metal area layer 213 is also in symmetric distribution at the two sides of the display area.

As stated above, the capacitor structure is formed and the test point is elicited through the signal line, thus it can be monitored whether the working state of the GOA unit is normal by testing the change of voltage on the test point on the FPC.

Next, the circuit test method of a display panel of embodiment 2 of the present invention will be illustrated.

The method includes the steps of: a capacitor constituting step, arranging an insulating layer and a metal area layer on the TFT substrate successively, the metal area layer and the TFT substrate provided with GOA units constitute a capacitor structure, the metal area layer is constituted using an ITO layer; a signal eliciting step, eliciting a signal line from the capacitor structure, the signal line is connected with the GOA circuit area in the capacitor structure so as to elicit a signal; a test point forming step, eliciting the signal line to the outside of the GOA circuit area and taking an eliciting point outside the GOA circuit area as a test point, specifically, taking the eliciting point on an FPC outside the GOA circuit area to which a signal is led by the signal line through the IC circuit as the test point; and a signal test step, monitoring a working state of the GOA unit by testing a change of voltage on the test point.

As stated above, the display panel and the circuit test method thereof according to embodiment 2 of the present invention can find the position where short circuit/open circuit occurs in the GOA circuit area quickly by monitoring the voltage on the test point, thereby shortening the time of seeking ESD and short circuit/open circuit, increasing the analyzing and improving speed.

Embodiment 3

Next, embodiment 3 of the present invention will be illustrated.

Embodiment 3 applies the technical concept of the present invention into an in-cell touch panel. The in-cell touch panel embeds a touch layer into a liquid crystal panel. Specifically, the in-cell touch panel integrates the touch layer and the display panel together, and the touch layer is embedded into the display panel. If the technical concept of the present invention is applied to the in-cell touch panel, it is required to arrange a metal area (an ITO layer) at a position of a lower surface of the glass cover plate corresponding to the GOA unit, and constitute a capacitor structure with the metal area and the GOA unit (or, the TFT substrate).

Figure 6:
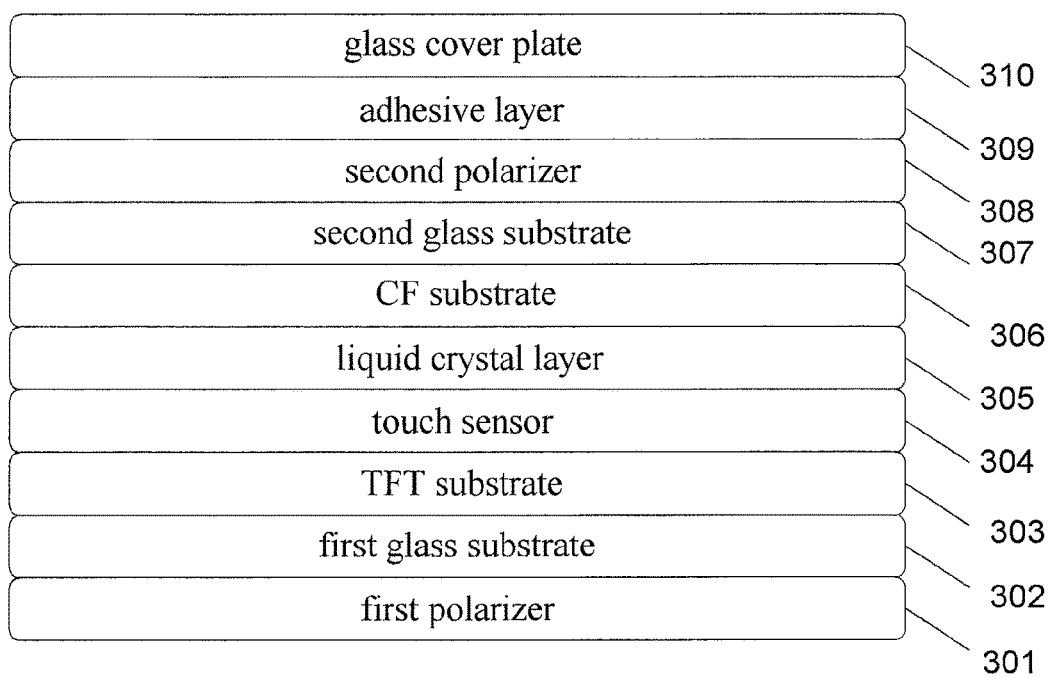
FIG. 6 represents a basic structure of an in-cell touch panel.

FIG. 6 represents a specific structure of an in-cell touch panel.

As shown in FIG. 6, the in-cell touch panel includes successively from bottom to top: a first polarizer 301, a first glass substrate 302, a TFT substrate 303, a touch sensor 304 (equivalent to a touch layer), a liquid crystal layer 305, a CF substrate 306, a second glass substrate 307, a second polarizer 308, an adhesive layer 309, and a glass cover plate 310.

A plurality of GOA units are arranged in the TFT substrate 303. A metal area is arranged at a position of a lower surface of the glass substrate 310 corresponding to the GOA unit. The metal area and the GOA unit constitute a capacitor structure. Moreover, the in-cell touch panel further includes: a signal line electrically connected with the capacitor structure, and a test point (not shown) elicited through the signal line.

In embodiment 3, the metal area of the glass cover plate 310 and the TFT substrate 303 on which the GOA units are arranged constitute a capacitor structure, thus the metal area and the TFT substrate 303 on which the GOA units are arranged are equivalent to two oppositely arranged conductive plates that constitute a capacitor. Electric capacity will be generated between such two oppositely arranged conductive plates.

In this embodiment, the metal area can be constituted by an ITO conductive layer. Moreover, similar as embodiment 1, an electrically connected signal line is elicited from the capacitor structure, a test point is elicited through the signal line, the test point is a test point on an FPC outside the GOA circuit area to which the signal line is led through an IC circuit. Optionally, the signal line is connected with the GOA circuit area in the capacitor structure.

As stated above, the capacitor structure is constituted and the test point is elicited through the signal line, thus it can be monitored whether the working state of the GOA unit is normal by testing a change of voltage on the test point on the FPC.

Next, the circuit test method of the in-cell touch panel of embodiment 3 of the present invention will be illustrated.

The method includes the steps of: a capacitor constituting step, arranging a plurality of GOA units on the TFT substrate, arranging a metal area at a position of a lower surface of the glass cover plate corresponding to the GOA unit, and the metal area and the GOA unit constituting a capacitor structure; a signal eliciting step, eliciting a signal line from the capacitor structure, the signal line is connected with the GOA circuit area in the capacitor structure so as to elicit a signal; a test point forming step, eliciting the signal line to the outside of the GOA circuit area and taking an eliciting point outside the GOA circuit area as a test point, specifically, taking an eliciting point on an FPC outside the GAO circuit area to which a signal is led by the signal line through an IC circuit as the test point; and a signal test step, monitoring a working state of the GOA unit by testing a change of voltage on the test point.

As stated above, the touch panel and the circuit test method thereof according to embodiment 3 of the present invention can find the position where short circuit/open circuit occurs in the GOA circuit area quickly by monitoring the voltage on the test point, thereby shortening the time of seeking ESD and short circuit/open circuit, increasing the analyzing and improving speed.

Embodiment 4

Next, embodiment 4 of the present invention will be illustrated.

Embodiment 4 applies the technical concept of the present invention into an on-cell touch panel. The on-cell touch panel embeds a touch sensor between a CF substrate and a polarizer in a display screen. Specifically, the on-cell touch panel integrates the touch layer and the display panel together, and the touch layer is located above the display panel. If the technical concept of the present invention is applied in the on-cell touch panel, it is required to arrange a metal area (an ITO layer) at a position of a lower surface of the glass cover plate corresponding to the GOA unit, and constitute a capacitor structure with the metal area and the GOA unit (or, the TFT substrate).

Figure 7:
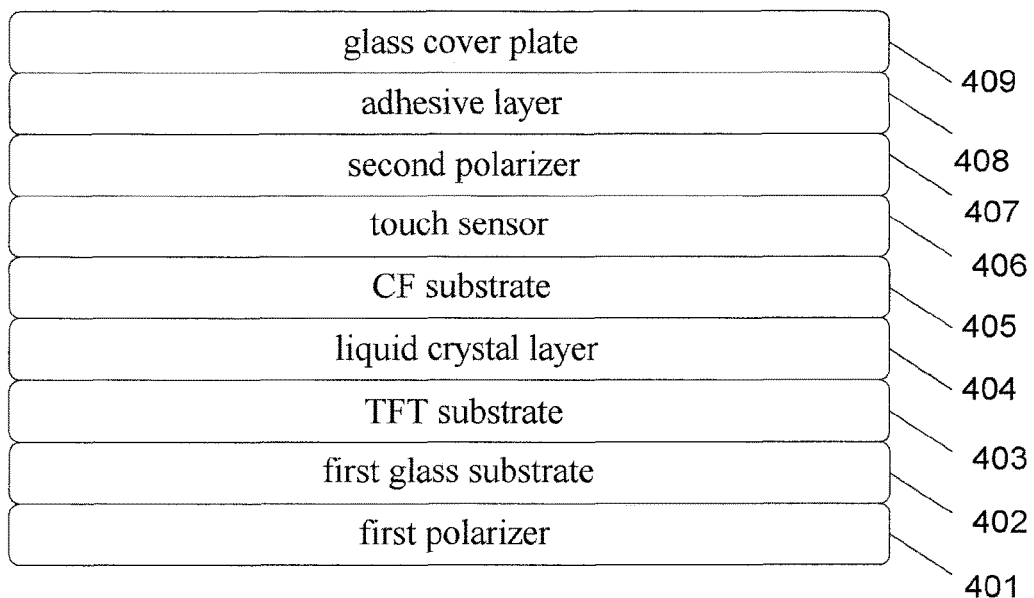
FIG. 7 represents a basic structure of an on-cell touch panel.

FIG. 7 represents a basic structure of an on-cell touch panel.

As shown in FIG. 7, the on-cell touch panel includes successively from bottom to top: a first polarizer 401, a first glass substrate 402, a TFT substrate 403, a liquid crystal layer 404, a CF substrate 405, a touch sensor 406 (equivalent to a touch layer), a second polarizer 407, an adhesive layer 408, and a glass cover plate 409.

A plurality of GOA units are arranged in the TFT substrate 403. Metal areas are arranged at positions of a lower surface of the glass cover plate 409 corresponding to the GOA units. The metal areas and the GOA units constitute capacitor structures. Moreover, the on-cell touch panel further includes: signal lines electrically connected with the capacitor structures, and test points (not shown) elicited through the signal lines.

In embodiment 4, the metal area arranged on the glass cover plate 409 and the TFT substrate 403 on which the GOA units are arranged constitute a capacitor structure, thus the glass cover plate 409 provided with the metal area and the TFT substrate 405 provided with the GOA units are equivalent to two oppositely arranged conductive plates that constitute a capacitor. Electric capacity will be generated between such two oppositely arranged conductive plates.

In embodiment 4, the metal area can be constituted by an ITO conductive layer. Moreover, similar as embodiment 1, an electrically connected signal line is elicited from the capacitor structure, a test point is elicited through the signal line, and the test point is a test point on an FPC outside the GOA circuit area to which the signal line is led through an IC circuit. Optionally, the signal line is connected with the GOA circuit area in the capacitor structure.

As stated above, the capacitor structure is constituted and the test point is elicited through the signal line, thus it can be monitored whether the working state of the GOA unit is normal by testing a change of voltage on the test point on the FPC.

Next, the circuit test method of the on-cell touch panel of embodiment 4 of the present invention will be illustrated.

The method includes the steps of: a capacitor constituting step, arranging a plurality of GOA units on the TFT substrate 403, arranging a metal area at a position of a lower surface of the glass cover plate 409 corresponding to the GOA unit, and the metal area and the GOA unit constituting a capacitor structure; a signal eliciting step, eliciting a signal line from the capacitor structure, the signal line is connected with the GOA circuit area in the capacitor structure so as to elicit a signal; a test point forming step, eliciting the signal line to the outside of the GOA circuit area and taking an eliciting point outside the GOA circuit area as a test point, specifically, taking an eliciting point on an FPC outside the GAO circuit area to which a signal is led by the signal line through an IC circuit as the test point; and a signal test step, monitoring a working state of the GOA unit by testing a change of voltage on the test point.

As stated above, the touch panel and the circuit test method thereof according to embodiment 4 of the present invention can find the position where short circuit/open circuit occurs in the GOA circuit area quickly by monitoring the voltage on the test point, thereby shortening the time of seeking ESD and short circuit/open circuit, increasing the analyzing and improving speed.

Embodiment 5

Next, embodiment 5 of the present invention will be illustrated.

Embodiment 5 applies the technical concept of the present invention into an OGS touch panel. The OGS touch panel integrates a touch screen and a glass cover plate together. If the technical concept of the present invention is applied in the OGS touch panel, it is required to arrange a metal area (an ITO layer) at a position of a lower surface of the glass cover plate corresponding to the GOA unit, and constitute a capacitor structure with the metal area and the GOA unit (or, the TFT substrate).

Figure 8:
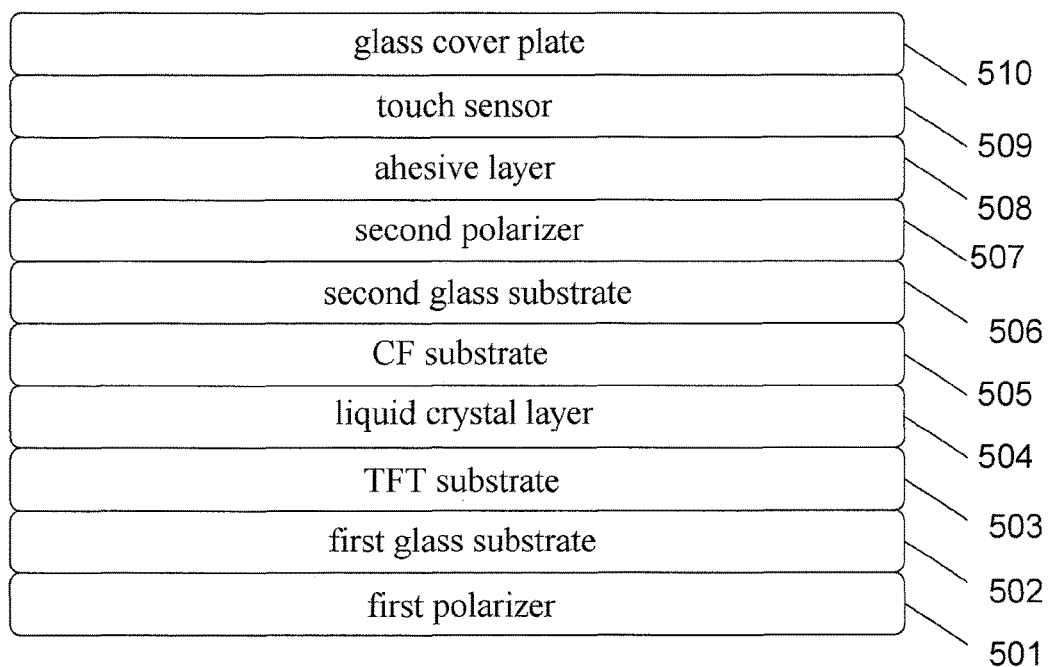
FIG. 8 represents a basic structure of an OGS touch panel.

FIG. 8 represents a basic structure of an OGS touch panel.

As shown in FIG. 8, the OGS touch panel includes successively from bottom to top: a first polarizer 501, a first glass substrate 502, a TFT substrate 503, a liquid crystal layer 504, a CF substrate 505, a second glass substrate 506, a second polarizer 507, an adhesive layer 508, a touch sensor 509 (equivalent to a touch layer), and a glass cover plate 510.

A plurality of GOA units are arranged in the TFT substrate 503. A metal area is arranged at a position of a lower surface of the glass cover plate 510 corresponding to the GOA unit. The metal area and the GOA unit constitute a capacitor structure. Moreover, the OGS touch panel further includes: a signal line electrically connected with the capacitor structure, and a test point (not shown) elicited through the signal line.

In embodiment 5, the glass cover plate 510 provided with the metal area and the TFT substrate 503 provided with the GOA units constitute a capacitor structure, thus the CF substrate 505 provided with the metal area and the TFT substrate 503 provided with the GOA units are equivalent to two oppositely arranged conductive plates that constitute a capacitor. Electric capacity will be generated between such two oppositely arranged conductive plates.

In embodiment 5, the metal area can be constituted by an ITO conductive layer. Moreover, similar as embodiment 1, an electrically connected signal line is elicited from the capacitor structure, a test point is elicited through the signal line, and the test point is a test point on an FPC outside the GOA circuit area to which the signal line is led through an IC circuit. Optionally, the signal line is connected with the GOA circuit area in the capacitor structure.

As stated above, the capacitor structure is constituted and the test point is elicited through the signal line, thus it can be monitored whether the working state of the GOA unit is normal by testing a change of voltage on the test point on the FPC.

Next, the circuit test method of the OGS touch panel of embodiment 5 of the present invention will be illustrated.

The method includes the steps of: a capacitor constituting step, arranging a plurality of GOA units on the TFT substrate 503, arranging a metal area at a position of a lower surface of the glass cover plate 510 corresponding to the GOA unit, the metal area and the GOA unit constituting a capacitor structure; a signal eliciting step, eliciting a signal line from the capacitor structure, the signal line is connected with the GOA circuit area in the capacitor structure so as to elicit a signal; a test point forming step, eliciting the signal line to the outside of the GOA circuit area and taking an eliciting point outside the GOA circuit area as a test point, specifically, taking an eliciting point on an FPC outside the GAO circuit area to which a signal is led by the signal line through an IC circuit as the test point; and a signal test step, monitoring a working state of the GOA unit by testing a change of voltage on the test point.

As stated above, the touch panel and the circuit test method thereof according to embodiment 5 of the present invention can find the position where short circuit/open circuit occurs in the GOA circuit area quickly by monitoring the voltage on the test point, thereby shortening the time of seeking ESD and short circuit/open circuit, increasing the analyzing and improving speed.

Embodiment 6

Next, embodiment 6 of the present invention will be illustrated.

Embodiment 6 applies the technical concept of the present invention into an out-cell touch panel. The so-called out-cell touch panel means hanging a touch layer on a glass substrate above a CF substrate.

Figure 9:
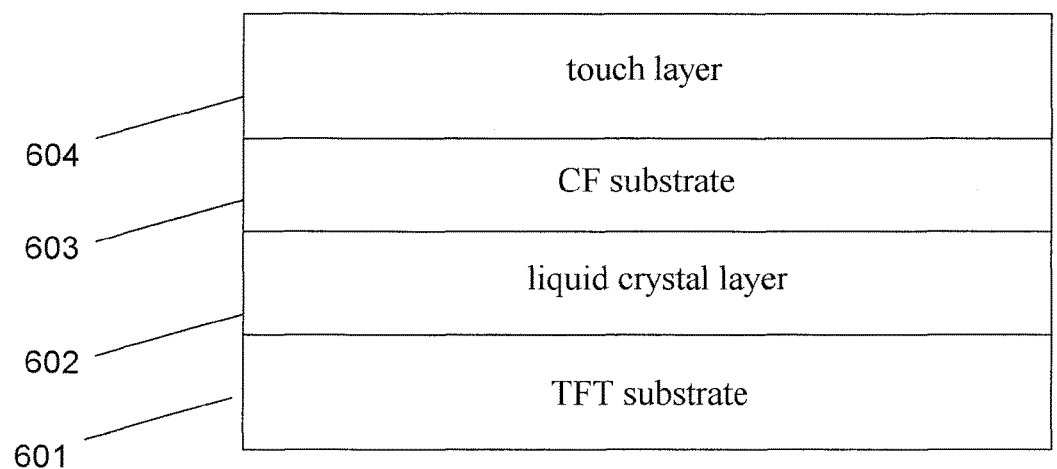
FIG. 9 represents a basic structure of an out-cell touch panel.

FIG. 9 represents a basic structure of an out-cell touch panel.

As shown in FIG. 9, the out-cell touch panel includes successively from bottom to top: a TFT substrate 601, a liquid crystal layer 602, a CF substrate 603, and a touch layer 604. The touch layer 604 is constituted by a touch sensor and a glass substrate.

A plurality of GOA units are arranged in the TFT substrate 601. A metal area is arranged at a position of the touch layer 604 corresponding to the GOA unit, and the metal area and the GOA unit constitute a capacitor structure. Moreover, the out-cell touch panel further includes: a signal line electrically connected with the capacitor structure; and a test point (not shown) elicited through the signal line. In embodiment 6, the touch layer 604 provided with the metal area and the TFT substrate 601 provided with the GOA units constitute a capacitor structure, thus the touch layer 604 provided with the metal area and the TFT substrate 601 provided with the GOA units are equivalent to two oppositely arranged conductive plates that constitute a capacitor. Electric capacity will be generated between such two oppositely arranged conductive plates.

In this embodiment, the metal area can be constituted by an ITO conductive layer. Moreover, similar as embodiment 1, an electrically connected signal line is elicited from the capacitor structure constituted by the touch panel 604 and the TFT substrate 601, a test point is elicited through the signal line, the test point is a test point on an FPC outside the GOA circuit area to which the signal line is led through an IC circuit. Optionally, the signal line is connected with the GOA circuit area in the capacitor structure.

As stated above, the capacitor structure is constituted and the test point is elicited through the signal line, thus it can be monitored whether the working state of the GOA unit is normal by testing a change of voltage on the test point on the FPC.

Next, the circuit test method of the out-cell touch panel of embodiment 6 of the present invention will be illustrated.

The method includes the steps of: a capacitor constituting step, arranging a plurality of GOA units on the TFT substrate, arranging a metal area at a position of the touch layer 604 corresponding to the GOA unit, the metal area and the GOA unit constituting a capacitor structure; a signal eliciting step, eliciting a signal line from the capacitor structure, the signal line is connected with the GOA circuit area in the capacitor structure so as to elicit a signal; a test point forming step, eliciting the signal line to the outside of the GOA circuit area and taking an eliciting point outside the GOA circuit area as a test point, specifically, taking an eliciting point on an FPC outside the GAO circuit area to which a signal is led by the signal line through an IC circuit as the test point; and a signal test step, monitoring a working state of the GOA unit by testing a change of voltage on the test point.

As stated above, the touch panel and the circuit test method thereof according to embodiment 6 of the present invention can find the position where short circuit/open circuit occurs in the GOA circuit area quickly by monitoring the voltage on the test point, thereby shortening the time of seeking ESD and short circuit/open circuit, increasing the analyzing and improving speed.

The above examples mainly explain the display panel, the liquid crystal display device, the touch panel and the circuit test method thereof according to the embodiments of the present invention. Although only some of the examples of the present invention are described, the ordinary skilled person in the art should understand that the present invention can be carried out in many other forms without deviating from its purpose and scope. Therefore, the exhibited examples are regarded as schematic rather than restrictive. The present invention may encompass various modifications and replacements in case of not departing from the spirit and the scope of the present invention defined by the claims attached.

The invention claimed is:

1. A display panel comprising: a display area and a GOA (gate driver on array) circuit area;
   wherein the GOA circuit area comprises:
   a plurality of GOA units arranged on a TFT (thin film transistor) substrate, and
   a plurality of metal areas arranged at positions of a CF (color film) substrate corresponding to the plurality of GOA units one-to-one and constituting a plurality of capacitor structures with the plurality of GOA units;
   the display panel further comprising:
   signal lines electrically connected with the plurality of capacitor structures; and
   test points formed on the signal lines.

2. The display panel according to claim 1, wherein the metal area is an ITO (indium tin oxide) layer.

3. The display panel according to claim 2, wherein the metal area is formed into a rectangle corresponding to the GOA unit.

4. The display panel according to claim 3, wherein the test points are arranged outside the GOA circuit area.

5. The display panel according to claim 4, wherein the signal line is connected with the GOA circuit area in the capacitor structure.

6. The display panel according to claim 5, wherein the test point is a test point on an FPC outside the GOA circuit area, to which the signal line is led through an IC circuit.

7. The display panel according to claim 1, wherein
   the GOA circuit area is in symmetric distribution at two sides of the display area; corresponding to the GOA circuit area, the plurality of metal areas is also in symmetric distribution at the two sides of the display area.

8. A touch panel comprising a glass cover plate, the display panel according to claim 1 and a touch layer; wherein the display panel and the touch layer are arranged under the glass cover plate.

9. A circuit test method of a display panel, the display panel comprising a display area and a GOA (gate driver on array) circuit area; the GOA circuit area comprising a plurality of GOA units arranged on a TFT (thin film transistor) substrate, wherein the method comprises the steps of:
   a capacitor constituting step, arranging a plurality of metal areas at positions on a CF (color film) substrate corresponding to the plurality of GOA units one-to-one so as to enable the plurality of metal areas to constitute a plurality of capacitor structures with the plurality of GOA units;
   a signal transmitting step, forming signal lines electrically connected with the plurality of capacitor structures;
   a test point forming step, forming a test point on each signal line;
   a signal test step, monitoring a working state of each GOA unit by testing a change of voltage on the test point.

10. The circuit test method of a display panel according to claim 9, wherein in the capacitor constituting step, the plurality of metal areas are constituted using an ITO (indium tin oxide) layer.

11. The circuit test method of a display panel according to claim 10, wherein in the capacitor constituting step, the each metal area is formed into a rectangle.

12. The circuit test method of a display panel according to claim 11, wherein in the signal transmitting step, each signal line is connected with a GOA circuit area in the capacitor structure so as to transmit a signal.

13. The circuit test method of a display panel according to claim 12, wherein in the test point forming step, an eliciting point on an FPC (flexible printed circuit) outside the GOA circuit area to which a signal is led by the signal line through an IC (integrated circuit) circuit is taken as a test point.

14. The circuit test method of a display panel according to claim 10, wherein in the signal test step, a working state of the GOA circuit area is monitored by testing a change of voltage on the test point.

15. The circuit test method of a display panel according to claim 14, wherein in the capacitor constituting step: the GOA circuit area is in symmetric distribution at two sides of the display area; corresponding to the GOA circuit area, the plurality of metal areas are also in symmetric distribution at the two sides of the display area.

\* \* \* \* \*